United States Patent [19]

Gansen

[11] Patent Number: 5,369,138

[45] Date of Patent: Nov. 29, 1994

[54] PREPARATION OF FLEXIBLE, MOLDED, COLD-CURE POLYURETHANE FOAMS

[75] Inventor: Peter Gansen, Cologne, Germany

[73] Assignee: Bayer Aktiengesellschaft, Leverkusen, Germany

[21] Appl. No.: 13,469

[22] Filed: Feb. 4, 1993

[30] Foreign Application Priority Data

Feb. 14, 1992 [DE] Germany .................. 4204395

[51] Int. Cl.⁵ .................................. C08G 18/00
[52] U.S. Cl. ............................. 521/159; 521/160; 521/170; 521/174; 521/177; 521/914; 528/59; 528/60; 528/65; 528/66; 528/67; 528/76; 528/85
[58] Field of Search ............ 521/159, 160, 170, 174, 521/177, 914; 528/59, 60, 65, 66, 67, 76, 85

[56] References Cited

U.S. PATENT DOCUMENTS

| | | | |
|---|---|---|---|
| 3,857,800 | 12/1974 | Fishbein et al. | 521/174 |
| 3,865,762 | 2/1975 | Repiquet et al. | 521/160 |
| 4,833,176 | 5/1989 | Wolf et al. | 521/160 |
| 5,063,253 | 11/1991 | Gansen et al. | 521/159 |

FOREIGN PATENT DOCUMENTS

2008639  8/1990  Canada .
1480972  7/1977  United Kingdom .

*Primary Examiner*—Samuel A. Acquah
*Attorney, Agent, or Firm*—Joseph C. Gil

[57] ABSTRACT

The present invention is directed to a process for the preparation of molded cold-cure polyurethane flexible foams. The process requires the use of aromatic polyisocyanates, a specifed mixture of polyether polyols which have specified ethylene oxide contents and a specified amount of water as blowing agent. The reaction is conducted in a closed mold at an isocyanate index of from 80 to 120.

4 Claims, No Drawings

PREPARATION OF FLEXIBLE, MOLDED, COLD-CURE POLYURETHANE FOAMS

BACKGROUND OF THE INVENTION

1. Field of the Invention

Flexible cold-cure polyurethane foams are known for use in a broad range of applications, and are used in the furniture and motor car industries. Where they are used as seat cushions or back rests, the resilience or damping action of the foam is an important factor. It is for this reason that resilience indices are specified for particular foam components.

Particularly resilient foam qualities are generally regarded as comfortable. Damping foams have the advantage that vehicle vibration is either not transmitted to the occupants, or is transmitted only in a weakened form. It is for these two reasons that it is desirable to be able to tailor the resilience of the foam for a motor car seat precisely to the requirements of the motor car manufacturer.

2. Description of the Prior Art

Processes for increasing damping action are known and are used as appropriate. A modification to the cellular structure, making it finer and more uniform, has the effect of increasing damping action. The damping action may also be increased, or the resilience reduced, by chemical means. One possibility is to add polyethers with OH numbers greater than 200 in proportions of from 5 to 25 wt-% of the total polyol component. A further possibility is to use methylenebis(phenyl isocyanates) ("MDI") on the isocyanate side instead of tolylene diisocyanate ("TDI") or modified TDI. The superior damping action provided by MDI (in comparison to TDI) has been regarded as especially advantageous.

The use of polyethers containing more than 50 wt-% of ethylene oxide in cold foam formulations is generally known. The usual quantity used (based upon the total quantity of polyether) is, however, less than 3 wt-%. In this function the polyethers are known as "cell openers". If concentrations in excess of 5 wt-% of polyether having an ethylene oxide content greater than 50 wt-% are used in typical cold-molded foam formulations, unstable or collapsing foams result.

Use of polyethers having an ethylene oxide content greater than 50 wt-% in cold foam formulations is described, for example, in German Offenlegungschrift 3,721,058, although in the latter case water quantities in excess of 5 wt-% are used. Foams prepared in this manner do not excel in terms of their high resilience; their character is much more that of damping. The stability of these foams is achieved by means of extremely low indices.

The use or addition of polyethers having an ethylene oxide content greater than 50 wt-% is also known for molded hot cure polyurethane flexible foams, as described, e.g., in German Offenlegungschrift 3,903,100. However, molded hot-cured foams are normally prepared with different raw materials (e.g., polyethers having only a maximum of 50% primary OH groups, pure TDI as isocyanate, stabilizers which exert a marked closing action, and incorporation of organometallic catalysts) than those used for molded cold-cure foam. The different type of basic raw materials and the special processing technology cause a different level of values in the resulting foams. Hot foam, for example, does not reach the high resilience values which distinguish molded cold-cure foam. In particular, the addition of polyethers having ethylene oxide contents greater than 50 wt-% in the polyol component does not, for hot foams have a destabilizing effect on the resulting foam. Also, the high resilience values, which result with cold foams, are not achieved.

SUMMARY OF THE INVENTION

It has now surprisingly been found that when polyethers having an ethylene oxide content greater than 50 wt-% are used, even with MDI as the isocyanate, highly resilient foams can be prepared.

DETAILED DESCRIPTION OF THE INVENTION

The present invention is directed to a process for the preparation of moulded cold-cure polyurethane flexible foams by reacting a) aromatic polyisocyanates with b) compounds having at least two hydrogen atoms capable of reacting with isocyanates, and having molecular weights of from 400 to 14,000 comprising:

1) from 5 to 30 wt-% of a polyether containing at least two hydroxyl groups, having an OH number of less than 150 and having an ethylene oxide content of at least 50 wt-% (based upon the total amount of alkylene oxide in said polyether b)1)) and 2) from 70 to 95 wt-% of a polyether containing at least two hydroxyl groups, having an OH number of from 14 to 50 and having an ethylene oxide content of from 5 to 25 wt-% (based upon the total amount of alkylene oxide in said polyether b)2)), c) optionally, one or more compounds having at least two hydrogen atoms capable of reacting with isocyanates and having molecular weights of from 32 to 399, d) from 2 to 4 wt-%, based upon the amount of component b) of water as blowing agent, and e) optionally, other blowing agents, catalysts and additional auxiliary substances and additives, in a closed mold and at an isocyante index of from 80 to 120.

According to the invention, it is preferred that a) polyisocyanates of the diphenylmethane diisocyanate type are used as component a), b) component b) is partially or totally reacted with the polyisocyanate in a pre-reaction to form a semiprepolymer or prepolymer, c) said index be from 95 to 105, and d) the functionality of component b)2) is between 3 and 6.

According to the invention, the useful isocyanates include aromatic polyisocyanates of the diphenylmethane diisocyanate and/or tolylene diisocyanate type. Specific isocyanates include 2,4- and 2,6-tolylene diisocyanate, and mixtures of such isomers ("TDI"); 4,4'- and/or 2,4'-diphenylmethane diisocyanate (MDI); polyphenyl-polymethylene polyisocyanates, such as are prepared by condensing aniline with formaldehyde and subsequent reaction with phosgene ("crude MDI"); polyisocyanates modified by carbodiimide groups, urethane groups, allophanate groups, isocyanurate groups, urea groups or biuret groups which are derived from 2,4- and/or 2,6-tolylene diisocyanate or 4,4'- and/or 2,4'-diphenylmethane diisocyanate; alkyl-substituted MDI types, as described, for example, in German Offenlegeschriften 2,935,318, 3,032,128 and 3,032,358.

The following MDI types are preferred: a) diphenylmethane diisocyanates in mixture with polyphenylpolymethylene polyisocyanates, where the proportion of the polyphenylpolymethylene polyisocyanate may be from 0 to 40 wt-% and the diphenylmethane diisocyanate isomer content from 100 to 60 wt-%; b) urethane-modified aromatic di-/poly-isocyanates having NCO contents of from 15 to 30 wt-%, obtained by reacting a mixture of diphenylmethane diisocyanates and polyphenylpolymethylene polyisocyanates as described under a), with a hydroxyl compound, optionally even more than one hydroxyl compound, having a functionality of from 2 to 6; and c) mixtures of the MDI products designated under a) and/or b) containing a maximum of 25 wt-% aliphatic, cycloaliphatic, heterocyclic or further different types of aromatic polyisocyanates, as described e.g. by W. Siefken in Justus Liebigs Annalen der Chemie, 562, pages 75 to 136.

Furthermore, the invention contemplates the following preferred TDI types: a) tolylene diisocyanate as a mixture of the 2,4- and 2,6-isomers in 80/20 proportions ("T 80"); b) tolylene diisocyanate as a mixture of the 2,4- and 2,6-isomers in proportions 65/35 ("T 65"); c) tolylene diisocyanate prepolymers; d) mixtures of TDI with diphenylmethane diisocyanate and/or polyphenylpolymethylene polyisocyanates.

Compounds having at least two hydrogen atoms capable of reacting with isocyanates and having molecular weights of from 32 to 399 may optionally be used. These include compounds containing hydroxyl groups and/or amino groups and/or thiol groups and/or carboxyl groups, and preferably compounds exhibiting hydroxyl groups and/or amino groups, which serve to increase chain length or serve as cross-linking agents. These compounds generally contain from 2 to 8, and preferably from 2 to 4, hydrogen atoms capable of reacting with isocyanates. Examples of these are disclosed in German Offenlegungschrift 2,832,253, pages 10 to 20.

Water is used as blowing agent in quantities of from 2 to 4 wt-%, and preferably from 2 to 3 wt-%, based upon the total amount of component b).

In addition, auxiliary substances and additives of the following types may be optionally used:
a) highly volatile organic substances as further blowing agents,
b) accelerators and retardants of the type known per se in conventional quantities,
c) surface-active additives, such as emulsifying agents and foam stabilizers; porosity regulators of the type known per se, such as paraffins or fatty alcohols or dimethyl poly-siloxanes; pigments or dyes; flame-proofing agents of the type known per se, e.g. trischloroethyl phosphate, tricresyl phosphate; stabilizers to guard against the effects of ageing and weathering; plasticizers; substances having a fungistatic and bacteriostatic action; and fillers such as barium sulphate, diatomaceous earth, carbon black or prepared chalk.

Auxiliary substances and additives which may optionally be used are known and are described for example in German Offenlegungschrift 2,732,292, pages 21 to 24. Further examples of such auxiliaries and additives and details relating to the way in which they are used and act are described in the Kunststoff-Handbuch, Volume VII, edited by Vieweg and Höchtlen, and published by Carl-Hanser-Verlag, Munich 1966, e.g. on pages 103 to 113.

According to the invention, the reaction components are reacted by the one-shot process, the prepolymer process or the semi-prepolymer process, which processes are known in the art. Mechanical equipment frequently used in the art is of the type described in U.S. Pat. No. 2,764,565. Details relating to processing equipment also contemplated by the invention are given in the Kunststoff-Handbuch, Volume VII, edited by Vieweg and Höchtlen, and published by Carl-Hanser-Verlag, Munich 1966, e.g. on pages 121 to 205.

The components are reacted according to the invention at an isocyanate index of from 80 to 120, and preferably at an index of from 95 to 105. The isocyanate index, a term which is very frequently used in the preparation of polyurethane foams, is indicative of the degree of cross-linking of a foam. It is customary to regard a foam as having been produced at an index of 100 if the theoretical quantity of isocyanate (or the quantity of isocyanate equivalent to the stoichio-metric ratios) is used. It is, therefore, possible with the aid of the index to define more precisely the degree of under- or over-cross-linking. The index is calculated by the following general formula:

$$\text{Index} = \frac{\text{isocyanate quantity (actual)}}{\text{isocyanate quantity (theoretical)}} \times 100$$

According to the invention, foaming is carried out in closed molds. Materials which may be used for the molds are metal, e.g. aluminium, or plastics, e.g. epoxy resin. The expandable reaction mixture expands in the mold to create the formed body. According to the invention, it is possible in this context to proceed in a manner such that so much expandable reaction mixture is placed in the mold that the foam which is created exactly fills the mold. It is also possible to work by placing in the mold more expandable reaction mixture than is necessary to fill the interior of the mold with foam. Consequently, in this latter case "overcharging" is used. Such a technique is disclosed, e.g., in U.S. Pat. Nos. 3,178,490 and 3,182,104.

The polyurethane flexible foams which may be obtained according to the invention find applications as, for example, dashboards, armrests (also car back rests), furniture for reclining, and seating, headrests, seats in passenger vehicles, preferably automobiles.

The invention is further illustrated but is not intended to be limited by the following examples in which all parts and percentages are by weight unless otherwise specified.

EXAMPLES

In the examples, the following materials were used:

Polyol A trimethylolpropane-initiated polyoxypropylene polyoxyethylene triol having 14% polymerised oxyethylene groups in the end position and an OH number of 36.

Polyol B trimethylolpropane-initiated polyoxypropylene polyoxyethylene triol having 14% polymerised oxyethylene groups in the end position and an OH number of 28.

Polyol C sorbitol-initiated polyoxypropylene-polyoxyethylene polyol having an OH number of 28 and having 18% polymerised oxyethylene groups in the end position.

Polyol D Trimethylolpropane-initiated polyoxypropylene polyoxyethylene triol having 18% polymerised oxyethylene groups in the end position and an OH number of 36.

Polyol E Glycerol-initiated polyoxypropylenepolyoxyethylene triol having 10% polymerised oxyethylene groups in the end position, a total oxyethylene group content of 73% and an OH number of 36.

Polyol F Sorbitol-initiated polyoxypropylene-polyoxyethylene polyol having an OH number of 100 and having 82% oxyethylene groups in the end position.

Polyol G Trimethylpropane-initiated polyoxypropylene-polyoxyethylene triol having 18% polymerised oxyethylene groups in the end position and an OH number of 28.

Catalyst 1 Bis(dimethylaminoethyl) ether (70 wt-% in dipropylene glycol)

Catalyst 2 Triethylenediamine (33 wt-% in dipropylene glycol)

Catalyst 3 Dimethylethanolamine

Catalyst 4 N,N-bis(dimethylaminopropyl) formamide

Catalyst 5 N-methyl N,N-bis(dimethylaminopropyl) amine

Catalyst 6 Triethylamine

Catalyst 7 Bis(dimethylaminopropyl) amine

Stabilizer 1 Silicon stabilizer, commercially avaiable as "B 4617", from Goldschmidt, Essen Stabilizer 2 Silicon stabilizer, commercially available as "B 4113" from Goldschmidt, Essen Stabilizer 3 Silicon stabilizer, commercially available as "B 8002" from Goldschmidt, Essen

EXAMPLE 1

100 parts by weight of A component were intensively mixed with 48.2 parts by weight of B component (isocyanate index 95). The reaction mixture was placed in a cubic metal mold heated to 50° C. The mold was sealed with a metal lid and the reaction mixture expanded therein.

| A Component | |
|---|---|
| Polyol B | 90 parts by weight |
| Polyol F | 10 parts by weight |
| Water | 3.0 parts by weight |
| Catalyst 1 | 0.1 parts by weight |
| Catalyst 2 | 0.7 parts by weight |
| Catalyst 3 | 0.3 parts by weight |
| Catalyst 4 | 0.6 parts by weight |
| Stabilizer 1 | 0.6 parts by weight |
| B Component MDI 82/15 | a mixture of 67 wt-% of 4,4' and 15 wt-% of 2,4'-diisocyanatodiphenylmethane and 18 wt-% of higher-functional polyisocyanates of the diphenylmethane series (proportion of double-nucleus 82 wt-% to 2,4'-isomer 15 wt-%) |

The flexible polyurethane foam had the following mechanical properties:

| Apparent density | (DIN 53420) | 54 kg/m$^3$ |
|---|---|---|
| Rebound resilience | (DIN 53577) | 66% |

COMPARATIVE EXAMPLE 1

100 parts by weight of A component were intensively mixed with 47.5 parts by weight of B component (isocyanate index 95). The reaction mixture was placed in a cubic metal mold heated to 50° C. The mold was sealed with a metal lid, and the reaction mixture expanded therein.

| A Component | |
|---|---|
| Polyol B | 100 parts by weight |
| Water | 3.0 parts by weight |
| Catalyst 1 | 0.1 parts by weight |
| Catalyst 2 | 0.5 parts by weight |
| Catalyst 3 | 0.3 parts by weight |
| Catalyst 4 | 0.6 parts by weight |
| Stabilizer 2 | 0.5 parts by weight |
| B Component MDI 82/15 | |

The resulting flexible polyurethane foam had the following mechanical properties:

| Apparent density | (DIN 53420) | 54 kg/m$^3$ |
|---|---|---|
| Rebound resilience | (DIN 53577) | 48% |

EXAMPLE 2

100 parts by weight of A component were intensively mixed with 49.2 parts by weight of B component (isocyanate index 105). The reaction mixture was placed in a cubic metal mould heated to 50° C. The mold was sealed with a metal lid, and the reaction mixture expanded therein.

| A Component | |
|---|---|
| Polyol B | 90 parts by weight |
| Polyol F | 10 parts by weight |
| Water | 2.5 parts by weight |
| Catalyst 1 | 0.1 parts by weight |
| Catalyst 2 | 0.7 parts by weight |
| Catalyst 3 | 0.3 parts by weight |
| Catalyst 4 | 0.6 parts by weight |
| Stabilizer 1 | 0.8 parts by weight |
| B Component MDI 66/6 | a mixture of 59 wt-% of 4,4' and 6 wt-% of 2,4'-diisocyanatodiphenylmethane and 34 wt-% of higher-functional polyisocyanates of the diphenylmethane series (proportion of double-nucleus 66 wt-% to 2,4'-isomer 6 wt-%) |

The resulting flexible polyurethane foam had the following mechanical properties:

| Apparent density | (DIN 53420) | 54 kg/m$^3$ |
|---|---|---|
| Rebound resilience | (DIN 53577) | 64% |

COMPARATIVE EXAMPLE 2

100 parts by weight of A component were intensively mixed with 48.5 parts by weight of B component (isocyanate index 105). The reaction mixture was placed in a cubic metal mold heated to 50° C. The mold was sealed with a metal lid, and the reaction mixture expanded therein.

| A Component | |
|---|---|
| Polyol A | 100 parts by weight |
| Water | 2.5 parts by weight |
| Catalyst 1 | 0.1 parts by weight |
| Catalyst 2 | 0.1 parts by weight |
| Catalyst 3 | 0.3 parts by weight |
| Catalyst 4 | 0.6 parts by weight |
| Stabilizer 1 | 0.1 parts by weight |
| B Component | |

MDI 66/6.

The resulting flexible polyurethane foam had the following mechanical properties:

| Apparent density | (DIN 53420) | 54 kg/m³ |
|---|---|---|
| Rebound resilience | (DIN 53577) | 54% |

EXAMPLE 3

100 parts by weight of A component were intensively mixed with 42.5 parts by weight of B component (isocyanate index 95). The reaction mixture was placed in a cubic metal mold heated to 50° C. The mold was sealed with a metal lid, and the reaction mixture expanded therein.

| A Component | |
|---|---|
| Polyol C | 75 parts by weight |
| Polyol D | 10 parts by weight |
| Polyol F | 15 parts by weight |
| Water | 2.5 parts by weight |
| Catalyst 2 | 0.5 parts by weight |
| Catalyst 6 | 1.0 part by weight |
| Catalyst 5 | 0.1 parts by weight |
| Stabilizer 3 | 0.1 parts by weight |
| B Component MDI 88/38 | a mixture of 50 wt-% of 4,4' and 38 wt-% of 2,4'-diisocyanatodiphenylmethane and 12 wt-% of higher-functional polyisocyanates of the diphenylmethane series (proportion of double-nucleus 88 wt-% to 2,4'-isomer 38 wt-%) |

The resulting flexible polyurethane foam had the following mechanical properties:

| Apparent density | (DIN 53420) | 54 kg/m³ |
|---|---|---|
| Rebound resilience | (DIN 53577) | 62% |

COMPARATIVE EXAMPLE 3

100 parts by weight of A component were intensively mixed with 71.0 parts by weight of B component (isocyanate index 95). The reaction mixture was placed in a cubic metal mold heated to 50° C. The mold was sealed with a metal lid, and the reaction mixture expanded therein.

| A Component | |
|---|---|
| Polyol C | 75 parts by weight |
| Polyol D | 10 parts by weight |
| Polyol F | 15 parts by weight |
| Water | 10 parts by weight |
| Catalyst 2 | 0.5 parts by weight |
| Catalyst 6 | 1.0 part by weight |
| Catalyst 5 | 0.1 parts by weight |
| Stabilizer 3 | 0.5 parts by weight |
| B Component MDI 88/38. | |

The resulting flexible polyurethane foam had the following mechanical properties:

| Apparent density | (DIN 53420) | 36 kg/m³ |
|---|---|---|
| Rebound resilience | (DIN 53577) | 40% |

This foam, which was prepared according to German Offenlegungschrift 3,721,058, exhibited a markedly lower rebound resilience.

EXAMPLE 4

100 parts by weight of A component were intensively mixed with 44.5 parts by weight of B component (isocyanate index 100). The reaction mixture was placed in a cubic metal mold heated to 50° C. The mold was sealed with a metal lid, and the reaction mixture expanded therein.

| A Component | |
|---|---|
| Polyol G | 90 parts by weight |
| Polyol E | 10 parts by weight |
| Water | 2.5 parts by weight |
| Catalyst 2 | 0.8 parts by weight |
| Catalyst 3 | 0.3 parts by weight |
| Catalyst 7 | 0.8 parts by weight |
| Stabilizer 2 | 0.5 parts by weight |
| Triethanolamine | 1.0 part by weight |
| B Component MDI 85/25 | a mixture of 60 wt-% of 4,4' and 25 wt-% of 2,4'-diisocyanatodiphenylmethane and 15 wt-% of higher-functional polyisocyanates of the double-nucleus 85 wt-% to 2,4'-isomer 25 wt-%) |

The resulting flexible polyurethane foam had the following mechanical properties:

| Apparent density | (DIN 53420) | 54 kg/m³ |
|---|---|---|
| Rebound resilience | (DIN 53577) | 68% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a molded cold-cure, flexible polyurethane foam comprising reacting:
   a) a polyisocyanate of the diphenylmethane diisocyanate type, said polyisocyanate containing from 6 to 38% by weight of 2,4'-diisocyanatodiphenylmethane, from 50 to 67% by weight of 4,4'-diisocyanatodiphenylmethane, and from 12 to 34% by weight of higher functional polyisocyanates of the diphenylmethane series, the %s by weight totalling 100%,
   b) a mixture of hydroxy-containing polyethers having molecular weights of from 400 to 14,000 consisting essentially of:
      1) from 5 to 30 wt-% of a polyether containing at least two hydroxyl groups, having an OH number of less than 150, and having an ethylene oxide content of at least 50 wt-%, based upon the total amount of alkylene oxide in said polyether b)1), and
      2) from 70 to 95 wt-% of a polyether containing at least two hydroxyl groups, having an OH number of from 14 to 50, and having an ethylene oxide content of from 5 to 25 wt-%, based upon the total amount of alkylene oxide in said polyether b)2), and c) from 2 to 4 wt-%, based upon the amount of component b), of water as blowing agent, in a closed mold and at an isocyanate index of from 80 to 120.

2. The process of claim 1, wherein component b) is completely or partially reacted with component a) in a pre-reaction to form a semi-prepolymer or prepolymer.

3. The process of claim 1, wherein said isocyanate index is from 95 to 105.

4. The process of claim 1, wherein said polyether b)2) contains between 3 to 6 hydroxyl groups.

* * * * *